March 10, 1970   J. E. SLAGG   3,500,282
PANEL MOUNTED, VARIABLY ADJUSTED ELECTRICAL COMPONENT
Filed Jan. 19, 1968

INVENTOR

James E. Slagg

BY *Ronald J Eriksen*

ATTORNEY

United States Patent Office 3,500,282
Patented Mar. 10, 1970

3,500,282
PANEL MOUNTED, VARIABLY ADJUSTED ELECTRICAL COMPONENT
James E. Slagg, South Milwaukee, Wis., assignor to Allen-Bradley Company, Milwaukee, Wis., a corporation of Wisconsin
Filed Jan. 19, 1968, Ser. No. 699,262
Int. Cl. H01c 1/02
U.S. Cl. 338—197          4 Claims

ABSTRACT OF THE DISCLOSURE

A rotatably adjustable electrical component including a rotatable member and a hollow bushing providing access to such member. The bushing has an extension for mounting directly to an apertured panel. The extension is provided with a radially compressible shoulder portion engageable with the front side of the panel upon insertion of the extension therein. A compression member is disposed between the base of the bushing and the panel to provide compressive forces between the base, the panel and the shoulder as a means of retaining the component in the panel.

BACKGROUND OF THE INVENTION

The present invention relates to means for panel mounting variably adjusted electrical components including a rotatable member, and may comprise components such as variable resistors, potentiometers, capacitors and rotatable switches.

Components of the nature disclosed herein have in the past either been mounted on printed circuit boards by direct soldering of the component terminals to the board conductor terminals, or have been panel mounted by means of relatively expensive and complicated threaded bushings and nut and washer assemblies. Such panel mounted fixtures often required additional machined extension members which added to the expense.

SUMMARY OF THE INVENTION

The present invention contemplates, in its preferred embodiment, the provision of an electrical component which may be actuated by means of a tool inserted through a hollow mounting bushing which has a base directly attached to the component. The hollow bushing is preferably molded from a plastic material, and includes a tubular axially extending portion of reduced diameter adapted to be inserted in an aperture of a supporting panel. The tubular extension is radially compressible, the preferred embodiment being provided with circumferentially spaced slots extending inwardly from the distal end of the extension to permit the extension to be so compressed. The extension is further provided with a radially extending shoulder portion intermediate its ends, which shoulder portion is preferably tapered towards the distal end of the extension for insertion into the panel aperture. As the tapered end passes through the aperture, it forces the slotted shoulder to be compressed radially inwardly until it passes through the aperture. Upon expansion of the shoulder to its original dimension, the component and its bushing will be fastened in place.

In order to securely fasten the bushing, it is desirable to provide an axially compressive element, which may take the form of a spring washer, or preferably a ring of resilient material which is positioned on the extension of the bushing prior to insertion of the unit in the panel aperture. The compressve forces of the ring or washer will then act against the base of the bushing and the back side of the panel along with the abutting shoulder of the extension to retain the component in place. It is also preferable to provide a rotative stop member which extends from the component or the bushing to engage a cooperating detent in the panel. The detent may take the form of another aperture drilled or otherwise formed in the panel.

Thus, the electrical component may be positioned in the panel and readily be adjusted by means of a tool inserted into the hollow bushing and its tubular extension from the front side of the panel. It is, however, contemplated that the rotatable member may terminate in a shaft extending through the bore of the hollow bushing and the apertured panel. In such case, the usual knobs or other means would be fastened to the shaft in conventional fashion.

It is therefore an object of the present invention to provide a means for mounting an electrical component in a panel, which means may take the form of an element which may be snapped in place in an aperture in the panel. The "snap-in" element is hollow in nature to permit insertion of a tool for actuating the electrical component from the front side of the panel.

A further object of the present invention is to provide an inexpensive and facilely adapted supporting means for a variable actuated electrical component, and thereby eliminate the need for conventional machine threaded bushing members and cooperating washer and nut assemblies. Secure support may be obtained without relying upon solder joints which must be carefully made to provide both electrical and mechanical connection.

BRIEF DESCRIPTION OF THE DRAWING

The attached drawing, which comprises a part hereof, discloses the invention, as follows.

DESCRIPTION OF THE PREFERRED EMBODIMENTS

Figure 1:
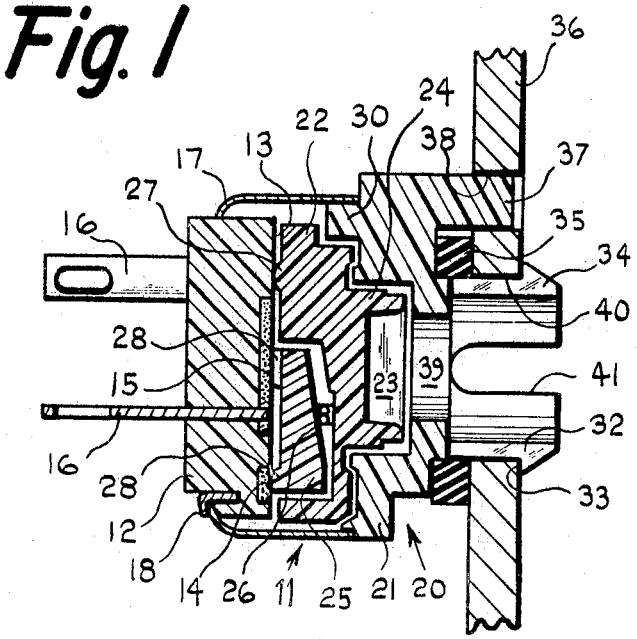
FIG. 1 is a longitudinal sectional view of a potentiometer incorporating the teachings of the present invention, and shown mounted in a supporting panel.
Figure 2:
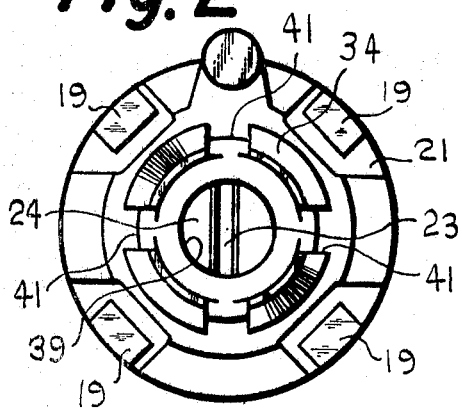
FIG. 2 is a front elevational view of the potentiometer of FIG. 1, and as removed from the panel.
Figure 3:
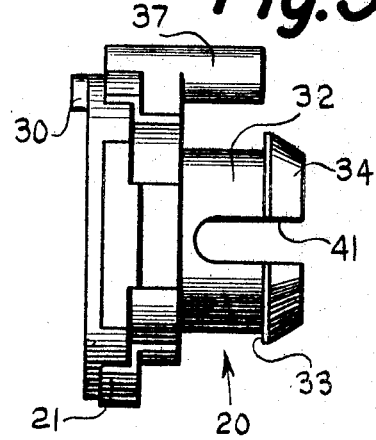
FIG. 3 is a side elevational view of the hollow bushing element.

The embodiment of the invention shown in FIGS. 1–3 illustrate a conventional variable resistor or potentiometer similar to that disclosed in Patent No. 2,839,642 granted to Clarence R Dickinson and Bernhard F. Tellkamp on June 17, 1958. The particular potentiometer is shown for illustrative purposes only, as the invention may apply to other potentiometer structures, variable resistors variable capacitors or even rotatable switch constructions. Thus, for purposes of description, it will be seen that the potentiometer referred to generally by the reference numeral 11 comprises a molded base 12 of insulating material having a circular front face 13. Embedded within the base 12 and exposed flush with the face 13 is a circular resistance track 14 in the form of a nearly completed ring. The track 14 comprises a shallow layer of conducting material in the form of distributed carbon black particles dispersed within the molding material of the base 12 to have become an integral portion thereof upon molding. Substantially concentric with the resistance track 14 is a collector track 15, also exposed flush with the face 13. The track 15 covers a circular area at the center of the face 13 and, like the track 14, is formed of a plurality of conducting particles molded integrally with the base 12 in the shallow layer near the surface. For a more detailed description of these tracks, reference should be had to the aforementioned Patent 2,839,642.

A set of three terminal leads 16 (one not shown because of the orientation of the drawing) are embedded within the base 1 at the time of molding and are disposed with the embedded end of one in electrical contact with the collector track 15 and the embedded ends of the others in contact with the end portions of the resistance track 14.

As shown in FIG. 1 the base 12 is seated in the closed end of the sleeve shaped metallic housing 17. It is retained in place by means of an element 18 which serves the dual purpose of providing a heat sink and an anchoring insert. The insert is more clearly disclosed in the aforementioned Patent 2,839,642. The cylindrical housing 17 is inwardly flanged and punched to closely surround the rearward extension of the base 12. Attachment ears (not shown) are clinched to securely hold the housing 17 in place and in contact with the base 12 by means of the embedded anchoring element 18.

At the front (see FIG. 2), the circular cylindrical housing 17 extends to provide a set of clamping ears 19. A hollow bushing shown generally by the reference numeral 20 with a circular base 21 seats upon the open edge of the housing 17 and the free ends of the ears 19 are bent over the base 21 to secure the bushing 20 to the housing 17. The bushing 20 is preferably formed of a plastic molding of polycarbonate material, although it will be apparent from the ensuing description that it may be otherwise formed from other suitable materials.

Within the housing 17 there is included a molded brush carrier 22 composed of an insulating material. As may be viewed in FIGS. 1 and 2, the brush carrier is provided with a screw driver slot 23. It will be apparent that the slot 23 is basically a tool-engaging element and may be of any desired configuration which will accept a tool inserted within the hollow bushing, i.e. either a conventional flat or Phillips headed screw driver, an Allen head wrench, etc. The slot 23 is formed in an outwardly extending reduced portion 24 of the brush carrier 22. The base 21 of the bushing 20 also serves as a seal for the elements contained within the housing 17.

The carrier 22 is recessed to receive an electrically conducting contact brush 25, which may be of carbon, and a pair of bias springs 26. The brush carrier 22 is preferably provided with integrally molded, triangularly spaced protrusions 27 (only one being shown in FIG. 1), which act as stops. The stops 27 space the brush carrier 22 from the face 13 of the base 12 to thereby prevent the brush carrier from wiping against or scratching the resistor and collector tracks 14 and 15. This is particularly true while the carrier is rotated to a selected position. The protrusions are positioned in such manner to avoid interference with the tracks 14 and 15.

The brush 25, which is specifically described in the aforementioned Patent 2,839,642, is provided with collector and resistor track engaging toes 28, each having a surface and sliding engagement with the respective tracks 14 and 15. The brush 25 is triangular in shape with the toes being placed near each of the apexes of the triangle. Two of the contact toes 28 rotate within a restricted radius confined to the limits of the spot-like area of the collector track 15. The toes 28 are spaced to provide stability for the brush 25 by providing a substantial dimension of the brush space area along all radii. The wirelike springs 26 rest against abutments (not shown) in the recess 29 of the carrier 22. The intermediate portion of each spring 26 bears against the back of the brush 25 and is bowed to provide necessary contact pressure against the brush toes 28 and the exposed surface areas of the tracks 14 and 15. The use of a plurality of springs 26 permits contacting engagement with the curved back of the brush 25 at more than 1 point and the spring characteristics obtained is similar to that of a flat spring.

Referring more particularly to the hollow mounting bushing 20, it will be apparent that the base 21 of the bushing is integrally molded therewith, and that inner side thereof includes a stop member 30, which is engageable with a stop member (not shown) on the brush carrier 22 to limit rotation of the brush carrier beyond the ends of a predetermined arc. The molded bushing 20 is further provided with a forwardly extending, integral portion 32 of reduced diameter, approximately, but slightly less than the diameter of an aperture 40 of a panel 36. The portion 32 is provided with a shoulder 33 and a tapered, distal end portion 34. Encircling the reduced diameter portion 32 is a flat, resilient annular washer 35.

The washer 35 is compressible and abuts the back side of the mounting panel 36. The front side of the panel 36 abuts against the shoulder 33 of the bushing 20. This arrangement holds the bushing and its attached electrical component 11 in tight fitting engagement with the panel 36.

It is preferable to provide an axially extending protuberance 37 which is engageable with the previously drilled, stamped, or otherwise formed aperture 38 in the panel 36. This protruberance or stop member 37 prevents rotation of the bushing 20 and its electrical component 11 when adjustments are being made to the electrical component 11.

The electrical component 11, with its bushing 20 is positioned in the panel by mere insertion of the tapered portion 34 into the aperture 40 of the panel 36. Since the tapered portion 34 flairs outwardly radially towards its inner end to provide the shoulder 33, it will be larger than the aperture 40, to thereby provide a camming action for radially compressing the portion 32 by means of the plurality of circumferentially spaced slots 41. This will permit the extending portion 32 to enter the aperture 40, against the compressive forces of the washer 35, until such time as the shoulder 33 protrudes through the aperture 40 and snaps radially outwardly to abut against the front side of the panel 36. At the same time, the stop portion 37 will enter the aperture 38 of the panel 36.

Figure 4:
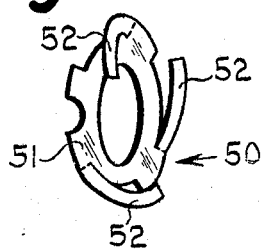
FIG. 4 is a perspective view of another embodiment of a compressible resilient member in the form of a spring washer.

A variation of the compressible resilient member seated on the reduced portion 32 of the bushing 20 is disclosed in FIG. 4. Here, the resilient member takes the form of a spring washer 50 which may be blanked and formed from sheet stock to provide a base 51 and upwardly bent, circumferentially spaced, tongues 52. The tongues 52 will be depressed to provide a spring bias, or compressive force, when the bushing 20 on the component 11 is inserted in the aperture 40 of the panel 36.

Mere insertion of an actuating tool (not shown), such as a flat headed screw driver in the bore 39 of the extending portion 32 to engage the slot 23 of the carrier 22 will provide desired adjustment of the component.

What is claimed is:
1. In a rotatably adjustable electrical component including a rotatable member and an open-ended housing for said member, the combination therewith of means for enclosing the open end of said housing and mounting said component in an apertured panel, said means comprising:

a hollow bushing having a base secured to and enclosing the open end of said housing and an integral centrally located hollow resilient extension adapted to be inserted in the aperture of said panel,
        said extension having a cross section intermediate its ends approximating, but less than the dimension of the panel aperture, and terminating at its distal end in a tapered headed portion, the taper of said head distending transversely in cross section to provide a peripheral shoulder portion intermediate the ends of said extension; and
    a resilient longitudinally compressible member disposed on said bushing extension,
        whereby said resilient bushing extension may be inserted in said panel aperture, with the tapered end portion providing a camming surface for said shoulder portion to contact said portion inwardly in order to pass through said aperture and against the bias of said compressible member, and after passing therethrough, to expand outwardly to engage the outer surface of said panel.

2. The rotatably adjustable electrical component of claim 1, wherein said bushing extension is slotted inwardly from its distal end to define a plurality of spaced apart resilient fingers, said fingers each defining said peripheral shoulder portion.

3. The rotatably adjustable electrical component of claim 1, wherein said bushing is formed from a plastic molding material.

4. The rotatably adjustable electrical component of claim 1, wherein the rotatable member presents an outer surface provided with a means for engaging an adjusting tool, and said hollow bushing defines a bore for receiving said tool and to provide access of said tool for engagement with said tool engagement means,

References Cited
UNITED STATES PATENTS

| | | |
|---|---|---|
| 2,092,371 | 9/1937 | Douglas. |
| 2,461,487 | 2/1949 | Wagstaff. |
| 2,734,963 | 2/1956 | Ardia. |
| 2,756,403 | 7/1956 | Francis et al. |
| 2,839,642 | 6/1958 | Dickinson et al. _____ 338—170 |
| 3,109,662 | 11/1963 | Bergstrom. |
| 3,110,213 | 11/1963 | Disley _____ 174—138.2 XR |
| 3,154,281 | 10/1964 | Frank _____ 174—164 |
| 3,239,640 | 3/1966 | Turnbull. |
| 3,298,641 | 1/1967 | Duerner _____ 338—197 XR |
| 3,366,911 | 1/1968 | Wilson et al. _____ 338—197 |

THOMAS J. KOZMA, Primary Examiner

U.S. Cl. X.R.

200—168; 338—184